(12) United States Patent
Breese et al.

(10) Patent No.: US 6,491,317 B1
(45) Date of Patent: Dec. 10, 2002

(54) FIFTH WHEEL SAFETY CATCH

(76) Inventors: Ralph L. Breese, 5504 Pioneer Cir., Norman, OK (US) 73072; Michael C. Dunbar, 3929 Northwest Sterling, Norman, OK (US) 73072

( * ) Notice: Subject to any disclaimer, the term of this patent is extended or adjusted under 35 U.S.C. 154(b) by 0 days.

(21) Appl. No.: 10/059,886

(22) Filed: Jan. 29, 2002

Related U.S. Application Data

(63) Continuation-in-part of application No. 10/012,089, filed on Dec. 11, 2001.
(60) Provisional application No. 60/316,801, filed on Aug. 30, 2001.

(51) Int. Cl.$^7$ ................................................ B62D 53/06
(52) U.S. Cl. ........................ 280/432; 280/433; 280/434; 280/457; 280/477
(58) Field of Search ................................. 280/432, 434, 280/457, 477, 404, 433; 24/287, 326, 572.1, 591.1, 591.3, 596.1

(56) References Cited

U.S. PATENT DOCUMENTS

| | | | |
|---|---|---|---|
| 2,411,404 A | * 11/1946 | Winn | .......................... 24/502 |
| 2,738,205 A | 3/1956 | Vaugoyeau | |
| 3,070,386 A | * 12/1962 | Gregg | .......................... 280/404 |
| 3,633,940 A | 1/1972 | Sinnard | |
| 3,751,079 A | * 8/1973 | Marulic et al. | ................ 403/27 |
| 3,811,706 A | * 5/1974 | Tucker et al. | ................ 280/434 |
| 3,823,960 A | 7/1974 | Boggs | |
| 3,823,961 A | 7/1974 | Korodi | |
| 3,912,301 A | * 10/1975 | Ferris | .......................... 280/457 |
| 4,700,966 A | 10/1987 | Hawkins | |
| 4,881,751 A | * 11/1989 | Torcomian | .................. 280/432 |
| 5,013,060 A | 5/1991 | Van Andel | |
| 5,839,745 A | 11/1998 | Cattau | |
| 6,213,492 B1 | 4/2001 | Ceccarelli, III | |
| 6,308,977 B1 | * 10/2001 | Pulliam et al. | ............. 280/432 |

* cited by examiner

Primary Examiner—Daniel G. DePumpo
Assistant Examiner—Daniel Yeagley
(74) Attorney, Agent, or Firm—Randal D. Homburg

(57) ABSTRACT

The invention is an attachment for a fifth wheel trailer hitch generally mounted within the bed of a vehicle to prevent damage to the vehicle in the event that the fifth wheel hitch fails due to faulty hook-up, the invention including a horizontal cross bar, two perpendicularly attached side bars with paired sets of bolt holes for mounting to the fifth wheel trailer hitch, a slide channel attached to the horizontal cross bar having an upper catch plate secured to the slide channel, and at least four bolts with lock nuts.

2 Claims, 2 Drawing Sheets

FIFTH WHEEL SAFETY CATCH

CROSS REFERENCE TO RELATED APPLICATIONS

Provisional Patent Application No. 60/316,801, filed on Aug. 30, 2001, and a subsequently filed utility patent, Ser. No. 10/012,089, filed on Dec. 11, 2001, referencing that provisional patent. This utility patent application is filed as a continuation-in-part.

I. BACKGROUND OF THE INVENTION

1. Field of Invention

The invention is an attachment for a fifth wheel trailer hitch generally mounted within the bed of a vehicle to prevent damage to the vehicle in the event that the fifth wheel hitch fails due to faulty hook-up, the invention including a horizontal cross bar, two perpendicularly attached side bars with paired sets of bolt holes for mounting to the fifth wheel trailer hitch, a slide channel attached to the horizontal cross bar having an upper catch plate secured to the slide channel, and at least four bolts with lock nuts.

2. Description of Prior Art

The following United States patents were discovered and are disclosed within this application for utility patent. All relate to trailer hitch devices, specifically fifth wheel hitches or pivot plate hitches. However, none of them have any utility remotely relative to the current invention.

In U.S. Pat. No. 6,213,492 to Ceccarelli, III, an fifth wheel hitch attaching to an underlift T-bar mechanism is disclosed, wherein a fifth wheel hitch may be installed in a box hitch of a vehicle to tow a fifth wheel trailer. A lock mechanism is disclosed in U.S. Pat. Nos. 5,839,745 to Cattau and 3,823,960 to Boggs, which provide a secondary lock for retaining the fifth wheel pin within the locking plate of the fifth wheel hitch.

Some patents deal with safety coupling devices for fifth wheel hitches which provide a secondary attachment on the fifth wheel hitch in the event of kingpin failure, including U.S. Pat. Nos. 3,633,940 to Sinnard and 2,738,205 to Vaugoyeau. A safety plug for a fifth wheel hitch is disclosed in U.S. Pat. No. 3,823,961 to Korodi, while an anti-jack-knifing control bar is the subject of U.S. Pat. No. 4,700,966 to Hawkins.

U.S. Pat. No. 5,013,060 to Van Andel discloses a platform mounted to the bed of a pickup which includes three channels, one front and two side channels surrounding a restraining plate which catches a kingpin which escapes the confines of the fifth wheel hitch due to accident or human error preventing damage to the bed and side rails of the towing vehicle. This device attaches to the base frame of the fifth wheel hitch and rides below the bottom plate of the fifth wheel hitch. It does not retain the kingpin in relative proximity to the flared mouth of the upper plate, positioning the kingpin for reattachment. Van Andel '060 also does not confine the kingpin in a lateral dimension, which allows the towed fifth wheel trailer to move and sway laterally, increasing the potential of a "jack-knife" or loss of control of the towed vehicle.

II. SUMMARY OF THE INVENTION

The primary objective of the invention is to provide a device attaching to a fifth wheel trailer hitch to protect the vehicle from damage in the event of a failed engagement of the fifth wheel hitch and the kingpin of the trailer at hookup or during detachment caused by the kingpin coming loose from the hitch and dropping onto the bed rails of the vehicle bed.

A second objective is to provide a device which maintains general alignment with the fifth wheel trailer hitch for re-engagement of the kingpin during the stopping motion of the vehicle, also preventing lateral sway of the fifth wheel trailer when disengaged from the fifth wheel hitch while confined in the fifth wheel safety catch of the current invention.

III. DESCRIPTION OF THE DRAWINGS

The following drawings are submitted with this utility patent application.

IV. DESCRIPTION OF THE PREFERRED EMBODIMENTS

Figure 4:
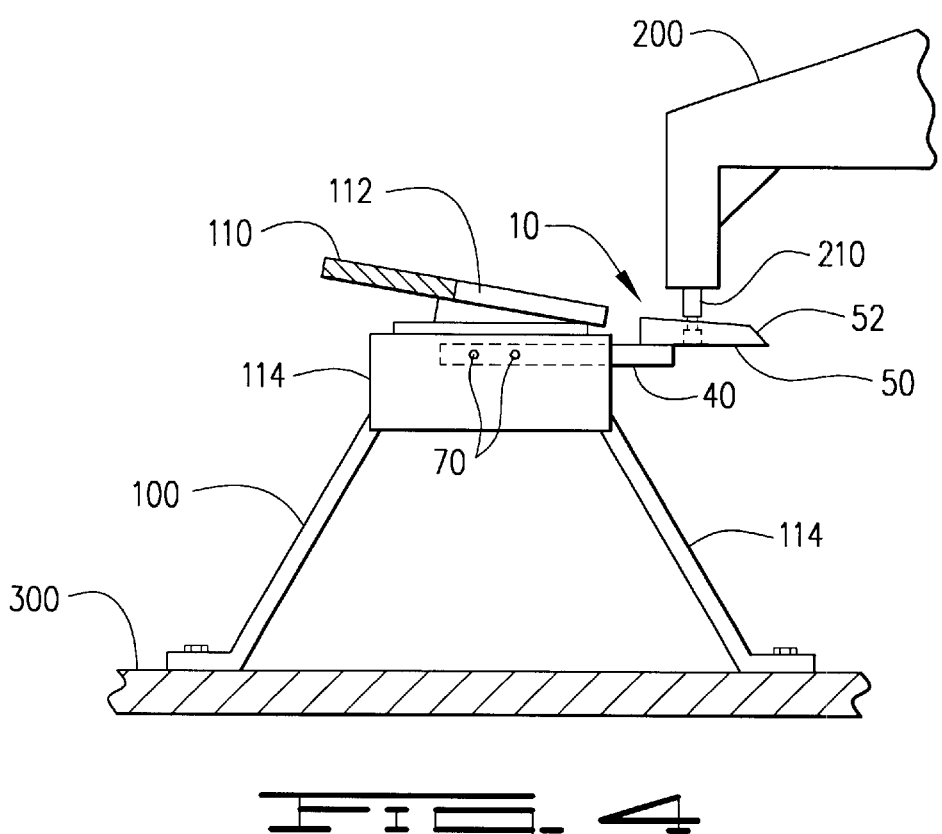
FIG. 4 is a cross-sectional side view of the fifth wheel safety catch attached to a fifth wheel trailer hitch in a vehicle and a fifth wheel trailer hitch with the kingpin retained within the fifth wheel safety catch.

The invention is a safety hitch device 10 attaching to a fifth wheel trailer hitch 100, shown in FIG. 4 of the drawings, having a receiver plate 110 with a kingpin slot 112, mounted to the bed 300 of a pickup, receiving a kingpin 210 having a grooved lower ring 212 from a fifth wheel trailer 200, the device 10 essentially comprising a U-shaped member 20 having a bight portion 30, two parallel legs 40, a channel segment 50 traversely mounted to the bight portion 30, and an upper plate 60 attached to the channel segment 50 , the upper plate 60 having a locking groove 62 to engage the grooved lower ring 212 of the kingpin 210 depending from the fifth wheel trailer 200, preventing upward or rear release of the kingpin 210 from the locking groove 62 in the event of a detachment. The channel segment 50 also has an angled front edge 52 which allows the kingpin 210 to ride up and over such angled front edge 52, the kingpin 210 dropping within the locking groove 62 of the upper plate 60 during attachment of the fifth wheel trailer 200 to the fifth wheel hitch 100 and until further directed to the kingpin slot 112 of the receiver plate 110.

Figure 1:
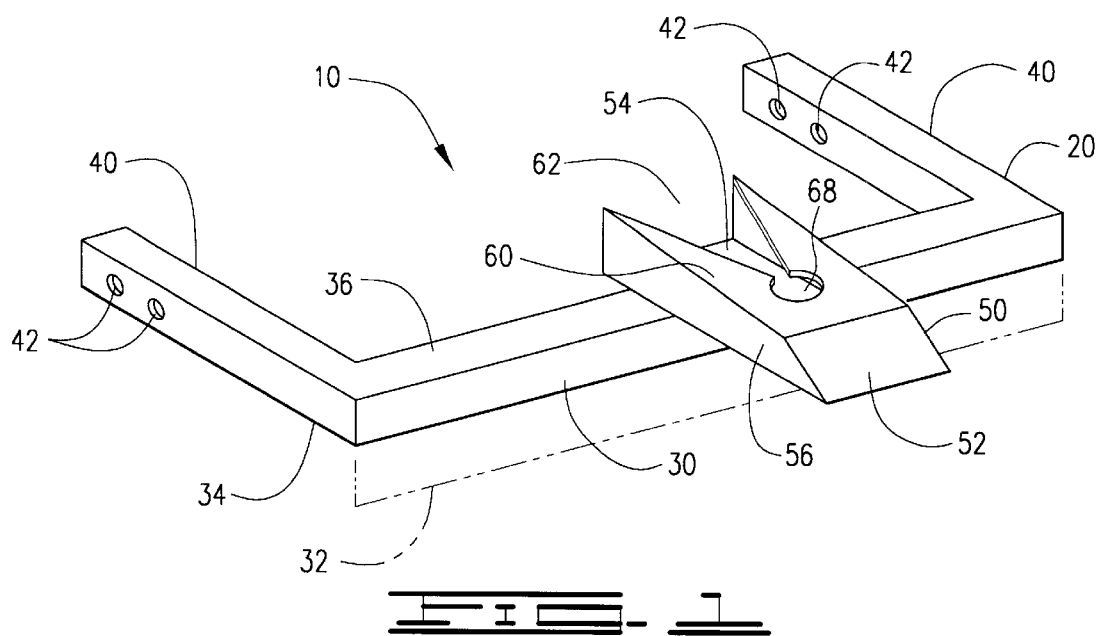
FIG. 1 is a perspective view of the fifth wheel safety catch.
Figure 2:
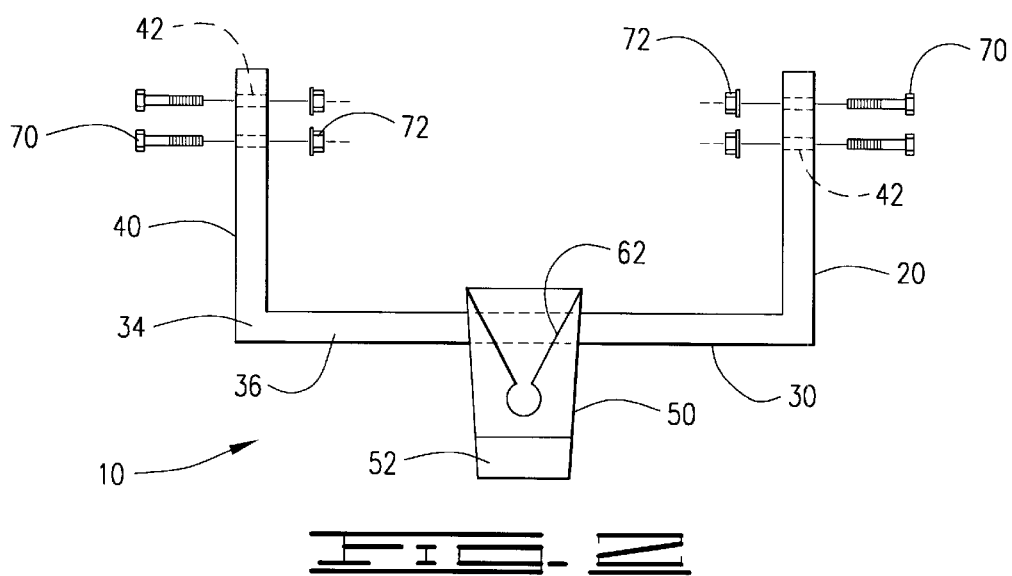
FIG. 2 is a top view of the fifth wheel safety catch.

The U-shaped member 20, as shown in FIGS. 1 and 2 of the drawings, further includes the bight portion 30 having a length 32 and two ends 34, and the two legs 40, one leg perpendicularly attached to each end 34 of the bight portion 30, the two legs 40 being parallel. The length 32 of the bight portion 30 is such that the two attached parallel legs 40 will cooperatively span a width of a mounting frame 114 of the fifth wheel trailer hitch 100, the mounting frame 114 having supplied pairs of holes, securing the parallel legs 40 to the mounting frame 114 by at least four bolts 70 and four lock nuts 72, such parallel legs 40 each having at least one pair of holes 42.

Figure 3:
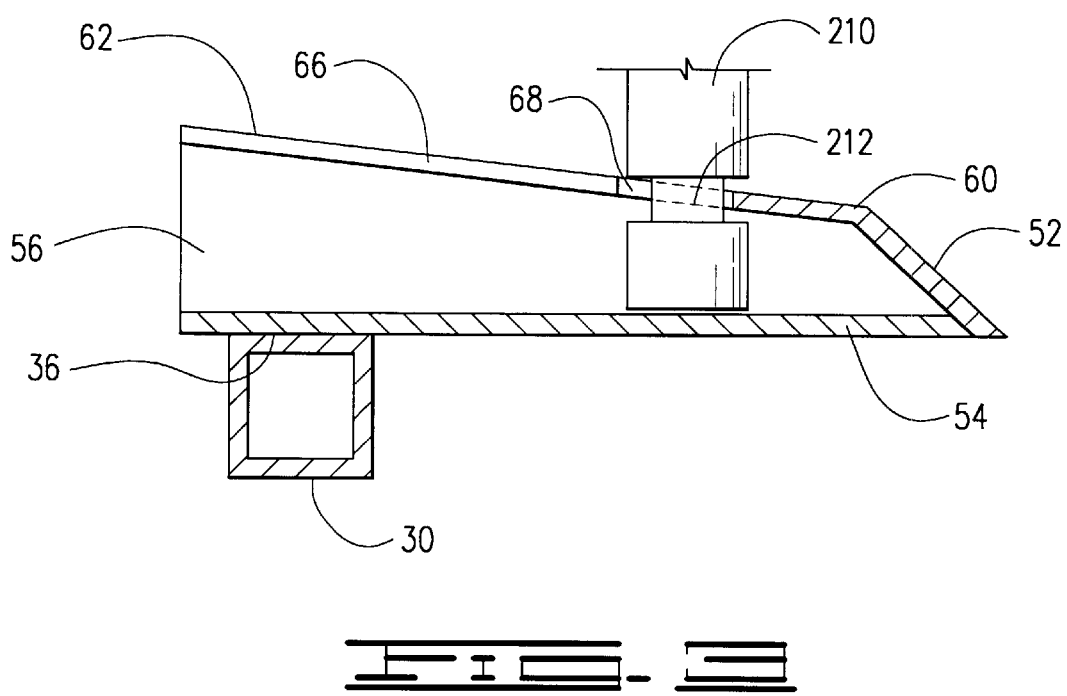
FIG. 3 is a side cross-sectional view of the fifth wheel safety catch relative to the kingpin.

The channel segment 50, as shown in FIGS. 1–3 of the drawings, is partially and upwardly open and traversely secured to an upper side 36 of the bight portion 30, the channel segment 50 having the angled front edge 52 and a base segment 54 from which two perpendicularly ascending walls 56 attach, the angled front edge 52 of the channel segment 50 as an incline into the bight portion 30 opposing the direction of the two parallel legs 40. Attaching onto the ascending walls 56 of the channel segment 50 is the upper plate 60 and the locking groove 62, the locking groove having an inner peripheral edge 66 which suitably engages the grooved lower ring 212 of the kingpin 210 depending from the fifth wheel trailer 200. Most preferably, the locking groove 62 has a tapered contour, diminishing towards the angled front edge 52 with a kingpin engagement segment 68 which is just large enough to accept the grooved lower ring 212 of the kingpin 210, but not the entire kingpin 210, providing a vertical retention of the kingpin 210 as well as a horizontal retention of the kingpin 210 within the locking groove 62.

Each pair of holes 42 in the legs 40 are presented to be aligned with holes located in the mounting frame 114 and retained by the bolts 70 and lock nuts 72, whereafter the locking groove 62 of the channel segment 50 is aligned with the kingpin slot 112 in the receiver plate 110, as shown in FIG. 4 of the drawings, directing the kingpin 210 from the fifth wheel trailer 200 from the channel segment 50 into the receiver plate 110, the kingpin 210 riding over the angled front edge 52 as the kingpin 210 is directed towards the kingpin slot 112. However, on removal of the kingpin 210 from the kingpin slot 112, the grooved lower ring 212 of the kingpin 210 would be caught within the locking groove 62, being directed along the inner peripheral edge 66 towards the kingpin engagement segment 68 wherein the kingpin 210 would remain, unless the kingpin 210 were to be brought forward and raised to a level above and outside the locking groove 62. Thus, in the event of an unintentional separation of the kingpin 210 from the kingpin slot 112 of the receiver plate 110 in fifth wheel trailer hitch 100, wherein gravity would normally cause the fifth wheel trailer 200 to fall upon a tailgate or bed rails of the pickup bed 300 causing damage, the kingpin 210, upon separation from the kingpin slot 112 of the receiver plate 110, will fall into the channel segment 50 and become caught within the locking groove 62 of the upper plate 60, avoiding damage to the pickup.

While the invention has been particularly shown and described with reference to a preferred embodiment thereof, it will be understood by those skilled in the art that changes in form and detail may be made therein without departing from the spirit and scope of the invention.

What is claimed is:

1. A safety hitch device attaching to a fifth wheel trailer hitch mounted to a bed of a pickup, such fifth wheel trailer hitch having a receiver plate with a kingpin slot accepting a kingpin having a grooved lower ring from a front of a fifth wheel trailer, the device essentially comprising:

a. a U-shaped member having a bight portion and two parallel legs;

b. a channel segment traversely mounted to the bight portion; and c. an upper plate attached to the channel segment, the upper plate having a locking groove engaging the grooved lower ring of the kingpin depending from the fifth wheel trailer, retaining the kingpin within the locking groove in the event of a detachment, the channel segment also having an angled front edge which directs the kingpin up and over such angled front edge, the kingpin dropping within the locking groove of the upper plate during attachment of the fifth wheel trailer to the fifth wheel hitch until further directed to the kingpin slot of the receiver plate.

2. The device, as disclosed in claim 1, further comprising:

a. the bight portion having a length and two ends, and the two legs, one leg perpendicularly attached to each end of the bight portion, the two legs being parallel;

b. the length of the bight portion such that the two attached parallel legs will cooperatively span a width of a mounting frame of the fifth wheel trailer hitch, the mounting frame having supplied pairs of holes, securing the parallel legs to the mounting frame by at least four bolts and four lock nuts, such parallel legs having at least one pair of holes;

c. the channel segment-is partially and upwardly open and traversely secured to an upper side of the bight portion, the channel segment having the angled front edge and a base segment from which two perpendicularly ascending walls attach, the angled front edge of the channel segment relating an incline into the bight portion opposing the direction of the two parallel legs;

d. the upper plate and the locking groove are attached to the top the ascending walls of the channel segment, the locking groove having an inner peripheral edge which engages the grooved lower ring of the kingpin depending from the fifth wheel trailer, the locking groove having a tapered contour, diminishing towards the angled front edge with a kingpin engagement segment large enough to accept the grooved lower ring of the kingpin, but not the entire kingpin, providing a vertical retention of the kingpin and a horizontal retention of the kingpin within the locking groove.

* * * * *